UNITED STATES PATENT OFFICE.

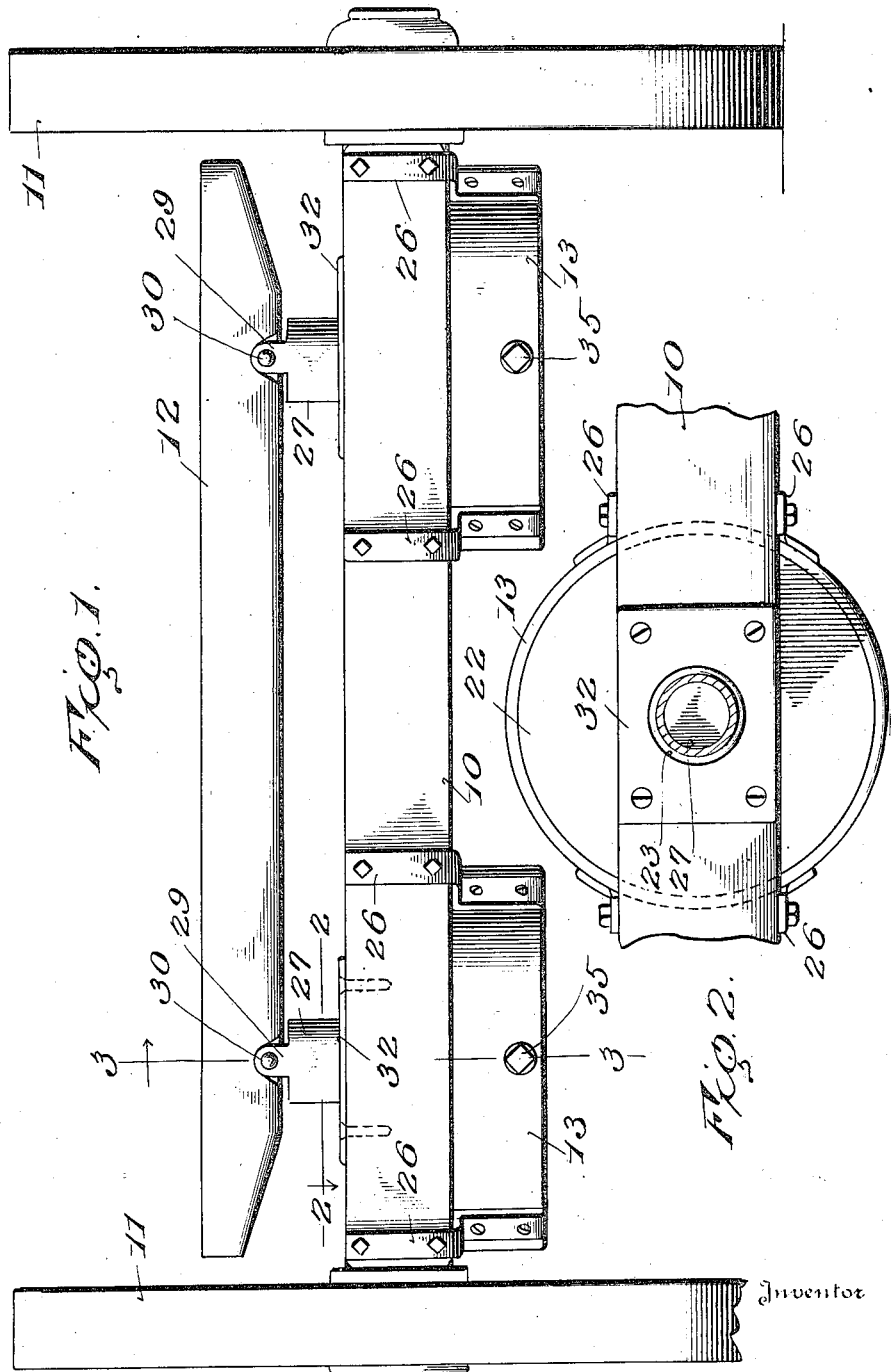

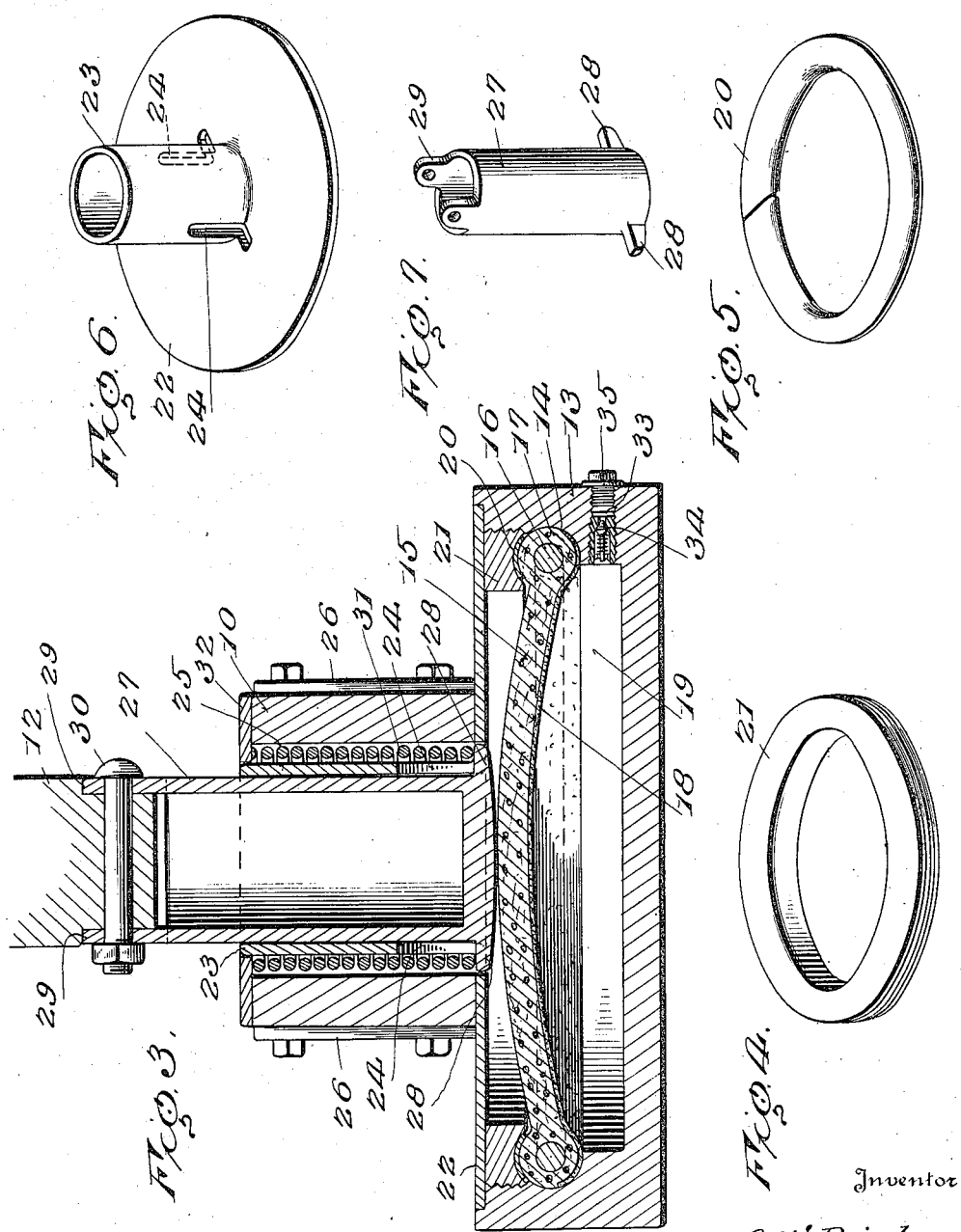

ABSALOM W. RICKS, OF REXBURG, IDAHO.

VEHICLE CUSHION-SPRING.

1,278,383.   Specification of Letters Patent.   Patented Sept. 10, 1918.

Application filed February 6, 1918. Serial No. 215,632.

*To all whom it may concern:*

Be it known that I, ABSALOM W. RICKS, a citizen of the United States, residing at Rexburg, in the county of Madison and State of Idaho, have invented certain new and useful Improvements in Vehicle Cushion-Springs, of which the following is a specification.

This invention relates to an improved cushion vehicle spring, being particularly designed for use upon wagons although it may also be employed in connection with pleasure vehicles, and has as its primary object to provide a device of this character which may be interposed between the axles of a wagon and the bolsters thereof for yieldably supporting the bolsters under the weight of the load.

The invention has as a further object to provide a device of the above described character employing an air cushion for yieldably supporting the load and wherein any rebound will be effectually counteracted by a suitable rebound resisting spring.

And the invention has as a still further object to provide a device which may be employed upon substantially any conventional type of wagon and which may be readily taken apart so that the device may be easily repaired.

Other and incidental objects will appear as the description proceeds and in the drawings, wherein I have illustrated the preferred embodiment of the invention, and wherein similar reference characters designate like parts throughout the several views:

Figure 1 is an elevation showing a pair of my air cushion springs applied to the rear axle of a conventional type of wagon, Fig. 2 is a transverse sectional view taken on the line 2—2 of Fig. 1 and looking in the direction of the arrows, this view particularly showing the stop plate employed for holding the rebound resisting spring of the device in position, Fig. 3 is a vertical sectional view taken on the line 3—3 of Fig. 1 and more particularly showing the structural details of the device, Fig. 4 is a detail perspective view showing the binding ring for the diaphragm of the device, Fig. 5 is a view similar to Fig. 4 and showing the split wear ring which is disposed between the binding ring and the rim of the diaphragm, Fig. 6 is a detail perspective view showing the cap of the device, and Fig. 7 is a detail perspective view illustrating the plunger employed.

As previously intimated, my improved cushioning spring, while being particularly designed for use upon wagons may, nevertheless, as will appear as the description proceeds, be also used with equal facility upon other vehicles, such as automobiles or motor cars. However, I have, in the drawings, shown the invention in its preferred adaptation and in Fig. 1 have illustrated the device in connection with the rear axle 10 of a conventional type of road wagon. This axle carries the rear wheels 11 of the vehicle and associated with the axle is the rear bolster 12. As shown in this figure, a pair of the improved devices is connected with the axle 10 adjacent the ends of the bolster 12 and since these devices are identical in construction, only one will be described.

Particular reference is now made to Figs. 2 and 3 and subsequent figures of the drawings, wherein it will be noted that, in carrying out the invention, my improved device is formed with a cylindrical body 13. This body is open at its upper end and the marginal wall thereof is cut away, upon its inner side, to provide an annular concave seat or channel 14. Engaged in this seat is a diaphragm 15. The body of this diaphragm is preferably formed of laminated sheets of fabric, much after the manner of the carcass of a pneumatic cord tire and the margin of the body is built around a peripheral supporting ring 16 which is formed of suitable metal. This construction provides an annular bead or rib 17 at the periphery of the diaphragm and this bead is, as particularly shown in Fig. 3, adapted to snugly engage within the concave seat 14 of the body 13 being sealed to the seat to provide an air-tight joint therebetween. Secured in any approved manner to the inner face of the body of the diaphragm to completely overlie the inner side thereof, is a sealing sheet 18 of rubber, this sheet being designed to render the diaphragm air-tight. It is now to be noted that the diaphragm is substantially concavo-convex and is mounted with its convex side presented upwardly, defining an air chamber 19 within the body 13 below the diaphragm. Overlying the rib 17 of the diaphragm is a split annular wear strip 20, shown in detail in Fig. 5 of the drawings. This wear strip is transversely curved to lie flat against the upper face of the said rib and screwthreaded into the upper end of the body to engage the said strip is a binding ring 21, shown in detail in Fig. 4 of the drawings. The inner side face of this binding ring is also transversely curved to seat flat against the wear strip 20, and the said ring may, of course, be adjusted within the body to tightly clamp the diaphragm in position. The wear strip will, as will be evident, prevent abrasion of the rib of the diaphragm by the binding ring when the said ring is so adjusted.

Removably connected with the body 13 of the device is a closure cap therefor, shown in detail in Fig. 6 of the drawings. This closure cap includes a body plate 22 countersunk into the upper edge of the marginal wall of the body and provided with an axial upstanding sleeve 23. Formed in opposite sides of this sleeve are longitudinally disposed slots 24 which, as particularly shown in Fig. 6, extend radially into the body plate 22 of the cap. In mounting the device upon the rear axle 10 of the wagon, the said axle is formed with a vertically disposed opening 25, and the sleeve 23 is projected through this opening so that the body plate 22 of the cap seats flat against the lower side face of the axle. Connecting the device with the axle are a plurality of straps 26 which are fastened in any approved manner to the body 13 and are bolted or otherwise secured to the opposite side faces of the axle. Two pairs of said straps are, as shown in Fig. 2, preferably employed, so that the device will consequently be rigidly held in place.

Slidably fitted through the sleeve 23 of the closure cap from the inner end of the said sleeve is a vertically reciprocable plunger 27, shown in detail in Fig. 7 of the drawings. This plunger may be hollow, as illustrated, or, if preferred, may be solid, and formed on the lower end of said plunger are oppositely disposed radial lugs 28 which are slidably received through the slots 24 of the cap sleeve. As will be clear, these lugs will consequently coact with the sleeve for locking the plunger against rotation. At its lower end the plunger is, as particularly shown in Fig. 3, provided with a rounded or convex terminal to engage the diaphragm 15 axially thereof and at its upper end is formed with oppositely disposed lugs 29. The bolster 12 is, as also particularly shown in Fig. 3, cut away upon opposite sides thereof to freely fit between these lugs and swingingly connecting the bolster with the said lugs is a bolt or other suitable fastening device 30.

Surrounding the sleeve 23 of the closure cap and loosely received within the opening 25 in the axle 10 is a helical rebound resisting spring 31 engaged at its lower end with the lugs 28 of the plunger and retained at its upper end by a plate 32 fitted over the upper terminal of the said sleeve and secured by screws or other suitable fastening devices to the upper face of the axle 10. As will be clear this plate will thus also act to support the said sleeve at its upper terminal. The spring 31 is of a length to be normally compressed somewhat between the lugs 28 of the plunger and the plate 32 and will consequently always be under a tension acting against the diaphragm 15.

In use, compressed air is introduced within the body 13 beneath the diaphragm 15 where it will be retained within the air chamber 19. For this purpose the body may be provided with an opening 33 into which the hose of an air pump may be screwed, and disposed within the said opening is a suitable valve mechanism 34 normally acting to cut off back flow of air from the chamber 19. Closing the said opening at its outer end is a removable plug 35. The compressed air in the chamber 19 will, of course, normally support the diaphragm in upwardly bowed position against the action of the spring 31 and consequently yieldably sustain the plunger 27 to support the load upon the bolster 12. When the wagon is passing over rough roads, the plunger 27 may, however, move downwardly within the sleeve 23 of the closure cap to flex the diaphragm downwardly against the cushion of air within the chamber. Thus, the bolster will be supported directly by such cushion of air to consequently prevent communication of any severe shocks or jolts directly to the bolster. Upon the return upward movement of the plunger, rebounding under the action of the air cushion beneath the diaphragm, the rebound resisting spring 31 will act against the lugs 28 of the plunger to cushion and absorb such rebound, the said spring being under tension, as previously described, so that the plunger will be normally held to float between the spring and the diaphragm 15. In this connection it is to be noted that, as particularly brought out in Fig. 3, the plunger normally projects above the upper face of the axle 10 such distance that the bolster is placed above the axle a distance corresponding to the distance between the central portion of the diaphragm 15 and the bottom of the body 13. Consequently, should the device be subjected to a shock sufficiently severe to completely depress the diaphragm, the bolster will simultaneously engage the axle to relieve the diaphragm of the load.

It will, therefore, be seen that I provide a particularly simple and efficient construction for the purpose set forth. Since one of the improved devices is employed adjacent each end of the bolster, as shown in Fig. 1, the bolster will be yieldably supported throughout its entire length with respect to the axle and in being pivotally connected with the plungers of the said devices, may pivot with respect thereto, should the load be greater at one side of the wagon than at the other. At the same time the bolster will be rigidly held against bodily movement longitudinally of the axle or against such movement transversely of the axle, for firmly supporting the load and in this connection it is to be noted that since the guide sleeves 23 are rigidly held at their upper ends by the plates 32, these sleeves will, in turn, act to rigidly support the upper extremities of the plungers under any longitudinal or transverse stress upon the bolster. While I have shown and described the device in connection with a rear axle and bolster of a wagon, it will, of course, be understood that the device is to be employed in a similar manner in connection with the front axle and bolster of the wagon, four of the devices constituting a set for the wagon.

Having thus described the invention, what is claimed as new is:

1. A device of the character described including a hollow body, a diaphragm mounted therein and defining a chamber of air within the body normally distending the diaphragm, a cap for the body and including a guide sleeve having slots formed therein, a plunger reciprocable through said sleeve and supported against downward movement by the diaphragm, lugs carried by said plunger to slidably project through said slots, and a spring surrounding the guide sleeve and engaging said lugs for resisting upward rebounding movement of the plunger.

2. A device of the character described including a hollow body, a diaphragm mounted therein and defining a chamber of air within the body normally distending the diaphragm, a reciprocable plunger supported against downward movement by the diaphragm, a radial lug carried by the plunger, and a spring surrounding the plunger to engage said lug for resisting upward rebounding movement of the plunger.

3. A device of the character described including a hollow body, a diaphragm mounted therein and defining a chamber of air within the body normally distending the diaphragm, a cap for the body including a guide sleeve having a slot formed therein, a plunger reciprocable through said sleeve and supported against downward movement by the diaphragm, a lug projecting from the plunger and slidably received through said slot, a spring surrounding the sleeve and engaging at its lower end with the said lug, and a retaining plate for the spring fitting over the upper extremity of the sleeve to engage the upper terminal of the spring, the spring being adapted to resist the upward rebound movement of the plunger.

4. A device of the character described including a hollow body, a diaphragm mounted therein and defining a chamber of air within the body normally distending the diaphragm, a guide sleeve, a plunger reciprocable through said sleeve and supported against downward movement by the diaphragm, means projecting radially from the plunger to coact with said sleeve for holding the plunger against rotation, and yieldable means coacting with said first mentioned means for resisting upward rebounding movement of the plunger.

5. A device of the character described including a hollow body, a diaphragm mounted therein and defining a chamber of air within the body normally distending the diaphragm, a guide sleeve, a plunger reciprocable through said sleeve and supported against downward movement by the diaphragm, and yieldable means surrounding the said sleeve and operatively engaged by the plunger for resisting upward rebounding movement of the plunger.

6. A device of the character described including a hollow body, a diaphragm mounted therein and defining a chamber of air within the body normally distending the diaphragm, a guide sleeve, a plunger reciprocable through said sleeve and supported against downward movement by the diaphragm, yieldable means resisting upward rebounding movement of the plunger and surrounding said sleeve, and means at the upper end of said sleeve for retaining the said yieldable means in position.

7. A device of the character described including a hollow body, a diaphragm mounted therein and defining a chamber of air within the body normally distending the diaphragm, a reciprocable plunger supported against downward movement by the diaphragm, means holding the plunger against rotation, and yieldable means coacting with said first mentioned means for resisting upward rebounding movement of the plunger.

In testimony whereof I affix my signature.

ABSALOM W. RICKS. [L. S.]